(12) United States Patent
Wang

(10) Patent No.: US 7,123,322 B2
(45) Date of Patent: Oct. 17, 2006

(54) METHOD OF ALIGNING A TFT PLATE WITH A COLOR FILTER PLATE

(75) Inventor: Ying-Jie Wang, Hsin Tien (TW)

(73) Assignee: Chunghwa Picture Tubes, Ltd., (TW) n ( * ) Notice: Subject to any disclaimer, the term of this patent is extended or adjusted under 35 U.S.C. 154(b) by 118 days.

(21) Appl. No.: 11/012,262

(22) Filed: Dec. 16, 2004

(65) Prior Publication Data
US 2006/0098129 A1 May 11, 2006

(30) Foreign Application Priority Data
Nov. 11, 2004 (TW) .............................. 93134527 A

(51) Int. Cl.
*G02F 1/1335* (2006.01)
*G02F 1/141* (2006.01)

(52) U.S. Cl. ....................... 349/106; 349/110; 349/126

(58) Field of Classification Search ................ 349/106, 349/110–111, 187, 126
See application file for complete search history.

(56) References Cited

U.S. PATENT DOCUMENTS

| 5,870,157 A * | 2/1999 | Shimada et al. ............ 349/106 |
| 6,249,011 B1 * | 6/2001 | Matsumoto .................. 257/72 |
| 6,795,141 B1 | 9/2004 | Yamada |

* cited by examiner

Primary Examiner—Toan Ton

(57) ABSTRACT

A method of aligning a TFT plate and a color filter plate of a liquid crystal display is described. The TFT plate has a capacity storage area formed thereon. The capacity storage area is designed within a black matrix area on the color filter plate. After a rubbing process, a bump in the capacity storage area of the TFT plate causes a first abnormal rubbing area, which is adjacent to a side of the bump. The color filter plate is shifted first, so that the first abnormal rubbing area is covered with a black matrix in the black matrix area on the color filter plate. The TFT plate is then aligned with the color filter plate. As a result, corner image sticking in a frame of the liquid crystal display is avoided.

3 Claims, 2 Drawing Sheets original alignment condition alignment after shifting original alignment condition alignment after shifting

METHOD OF ALIGNING A TFT PLATE WITH A COLOR FILTER PLATE

RELATED APPLICATIONS

The present application is based on, and claims priority from, Taiwan Application Serial Number 93134527, filed on Nov. 11, 2004, the disclosure of which is hereby incorporated by reference herein in its entirety.

BACKGROUND OF THE INVENTION

1. Field of Invention

The present invention relates to aligning a thin-film transistor (TFT) plate with a color filter plate of a thin-film transistor liquid-crystal display (TFT LCD). More particularly, the present invention relates to shifting the color filter plate relative to the TFT plate, and then aligning them, to overcome the phenomenon of corner image sticking.

2. Description of Related Art

In the manufacturing process of a TFT LCD, a TFT plate and a color filter plate are manufactured first, the LCD is then formed, and finally the LCD module is formed. A TFT plate is also called an array plate.

In the stage of LCD formation, a rubbing process is performed on the TFT plate and the color filter plate, and then the TFT plate and the color filter plate are aligned. FIG. 1 is a partial cross-sectional view of the alignment of a TFT plate and the color filter plate. With reference to FIG. 1, the color filter plate has a substrate 102, a black matrix 104 formed on the substrate 102, and a color filter layer comprising a red (R) color resist 106 and a green (G) color resist 108. The red color resist 106 and the green color resist 108 are also formed on the substrate 102, and they partially overlap and cover the black matrix 104 in order to avoid light leakage. The color filter plate also has an electrically conductive layer (not shown in FIG. 1) acting as an electrode, which is formed to cover the red color resist 106, the green color resist 108, and the black matrix 104.

Still referring to FIG. 1, the TFT plate has a substrate 110 and a pixel electrode layer 112 formed on the substrate 110. The pixel electrode layer 112 has capacity storage areas 114 and 116, which are designed within a black matrix area of the color filter plate, that is, within the black matrix 104. Bumps 118 and 120 usually exist in the capacity storage areas 114 and 116. As shown in FIG. 1, the rubbing direction associated with the TFT plate and the color filter plate is from left to right. Prior to the rubbing process, a resin coating is formed on the TFT plate and on the color filter plate. The resin usually comprises polyimide, which is abbreviated as PI in the LCD industry. The rubbing process is performed by using a metal roller, covered with a nap cloth, to rub the resin coating, or rotating the roller to and fro along the surface of the resin coating, with the purpose of making subsequently placed liquid crystal molecules face in a specified direction in advance.

In FIG. 1, the overlapping portions of the color filter layer and the black matrix 104 cause height differences, and the bumps 118 and 120 on the TFT plate also cause height differences. When the rubbing direction is from left to right, the height difference x associated with the color resist 108 and the height difference y associated with the bump 120 result in regions where the resin coating there cannot be rubbed well, resulting in, for example, the abnormal rubbing areas 124 and 122, respectively. In addition, when the TFT plate and the color filter plate are aligned, the abnormal rubbing areas 124 and 122 overlap and are aligned. When the rubbing direction is from right to left, abnormal rubbing areas occur on the red color resist 106 and on the pixel electrode layer 112 adjacent to the bump 118, respectively.

The above-mentioned abnormal rubbing areas can cause the problem of corner image sticking in a frame displayed on the liquid crystal display. Since abnormal rubbing areas in the black matrix area are blocked by the black matrix 104, light leakage doesn't occur; on the other hand, since the abnormal rubbing areas 124 and 122 are within the display area, light leakage occurs and results in corner image sticking. The phenomenon of corner image sticking is illustrated in FIG. 2. When the lamps of the LCD panel are illuminated, there are white strip areas 202 and 204 on the four side edges of the corner image sticking examination frame 200. After the corner image sticking examination frame 200 switches to the fully black frame 206, some spots in the white strip areas 202 and 204 cannot turn dark, resulting in the phenomenon of corner image sticking 208. This is due to the larger thickness of the PI resin coating at the four side edges of the panel; the degree to which the resin coating on the abnormal rubbing areas cannot be rubbed is thus more serious, more easily causing the corner image sticking.

SUMMARY OF THE INVENTION

It is therefore an objective of the present invention to provide a method of aligning a TFT plate with a color filter plate for overcoming the phenomenon of corner image sticking.

In accordance with the foregoing and other objectives of the present invention, a method of aligning a TFT plate and a color filter plate is provided. A capacity storage area is on the TFT plate and is designed within a black matrix area of the color filter plate. After a rubbing process is performed on the TFT plate and the color filter plate, a bump in the capacity storage area on the TFT plate causes a first abnormal rubbing area, which is adjacent to a side of the bump. The method is performed by shifting the color filter plate, in order that the first abnormal rubbing area is covered with a black matrix in the black matrix area of the color filter plate, and then aligning the TFT plate with the color filter plate.

Since the TFT plate and the color filter plate are aligned after the color filter plate is shifted so that the abnormal rubbing area is covered with the black matrix, light leakage won't occur, and therefore the problem of corner image sticking can be avoided.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
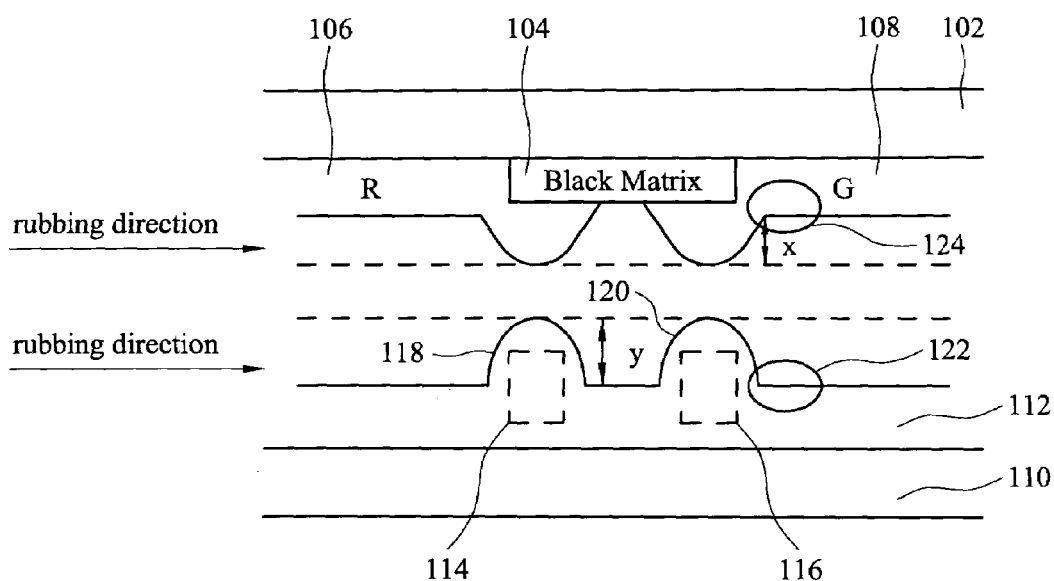
FIG. 1 is a partial cross-sectional view of the alignment of a TFT plate and a color filter plate.
Figure 2:
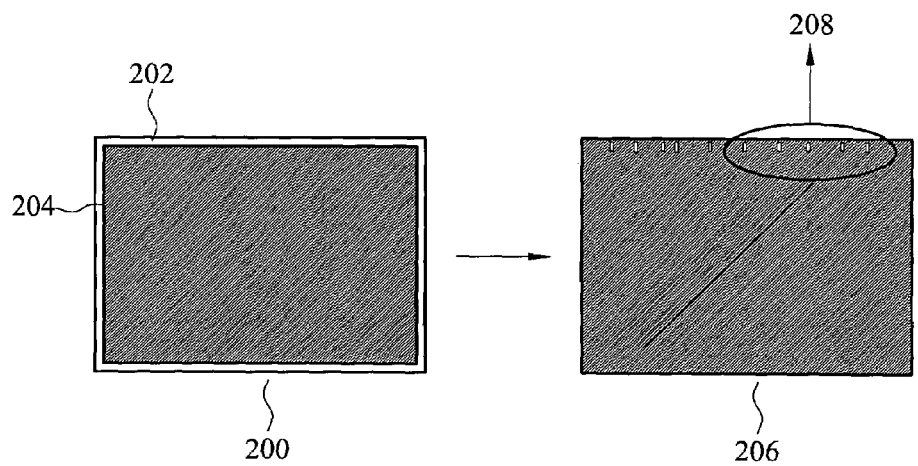
FIG. 2 illustrates the phenomenon of corner image sticking.

The invention provides a method of aligning a TFT plate with a color filter plate for overcoming the phenomenon of corner image sticking. As shown in FIG. 1, the capacity storage areas 114 and 116 are on the TFT plate and are designed within a black matrix area of the color filter plate, that is, within the black matrix 104. Bumps 118 and 120 usually exist in the capacity storage areas 114 and 116. After a rubbing process is performed on the TFT plate and the color filter plate, where the rubbing direction is from left to right, the bump 120 in the capacity storage area 116 on the TFT plate causes a first abnormal rubbing area 122, which is adjacent to a side of the bump 120. Moreover, the height difference x associated with the green color resist 108 causes a second abnormal rubbing area 124 on the color filter plate adjacent to the black matrix area.

The procedures of the method of aligning the TFT plate with the color filter plate according to the invention are described as follows. First, the color filter plate is shifted, so that the first abnormal rubbing area is covered with the black matrix in the black matrix area of the color filter plate, and the TFT plate is then aligned with the color filter plate. Alternatively, the color filter plate is shifted first, so that the first abnormal rubbing area is covered with the black matrix in the black matrix area of the color filter plate, and the first abnormal rubbing area and the second abnormal rubbing area do not overlap or are not aligned, and the TFT plate is then aligned with the color filter plate.

Figure 3A:
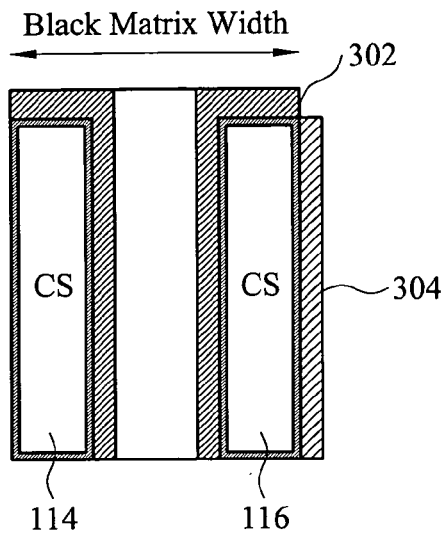
FIG. 3A is a top view of the alignment of the TFT plate and the color filter plate of FIG. 1.
Figure 3B:
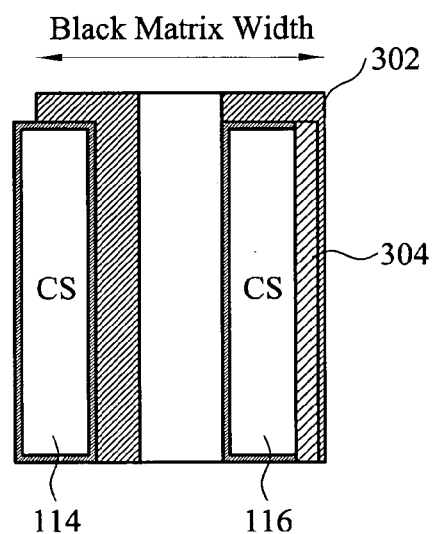
FIG. 3B is a top view of the alignment of the TFT plate and the color filter plate of FIG. 1 after the color filter plate is shifted according to an embodiment of the invention.

Referring to FIGS. 3A–3B, a preferred embodiment of the invention is described as follows. FIG. 3A is a top view of the alignment of the TFT plate and the color filter plate of FIG. 1. With reference to FIG. 3A, the capacity storage areas 114 and 116 denoted by the symbol CS are designed within the black matrix area 302 of the color filter plate. Since the abnormal rubbing area 304, resulting from the overlap of the first abnormal rubbing area 122 and the second abnormal rubbing area 124, is not covered with the black matrix area 302 when the TFT plate and the color filter plate are aligned, light leakage will occur to cause the phenomenon of corner image sticking. Accordingly, FIG. 3A illustrates the original alignment condition.

FIG. 3B is a top view of the alignment of the TFT plate and the color filter plate of FIG. 1 after the color filter plate is shifted according to an embodiment of the invention. As shown in FIG. 3B, the color filter plate is shifted to the right, so that the abnormal rubbing area 304 is covered with the black matrix in the black matrix area 302 of the color filter plate, and the TFT plate is then aligned with the color filter plate. After the color filter plate is shifted to the right, the first abnormal rubbing area 122 and the second abnormal rubbing area 124 of FIG. 1 will not overlap or be aligned. In another respect, when the rubbing direction is from right to left and an abnormal rubbing area will be adjacent to a side of the bump 118 and not covered with the black matrix area 302, the color filter plate has to be shifted to the left, so that the abnormal rubbing area is covered with the black matrix in the black matrix area 302 of the color filter plate.

According to preferred embodiments of the invention, advantages of using the invention include the following. Since the TFT plate and the color filter plate are aligned after the color filter plate is shifted so that the abnormal rubbing area is covered with the black matrix, light leakage won't occur, and therefore the problem of corner image sticking can be avoided.

Although the present invention has been described in considerable detail with reference to certain preferred embodiments thereof, other embodiments are possible. Therefore, their spirit and scope of the appended claims should not be limited to the description of the preferred embodiments contained herein.

What is claimed is:

1. A method of aligning a thin-film transistor (TFT) plate and a color filter plate, a capacity storage area being on said TFT plate and being designed within a black matrix area of said color filter plate, wherein after a rubbing process is performed on said TFT plate and said color filter plate, a bump in said capacity storage area on said TFT plate causes a first abnormal rubbing area, and said first abnormal rubbing area is adjacent to a side of said bump, said method comprising:

shifting said color filter plate, in order that said first abnormal rubbing area is covered with a black matrix in said black matrix area of said color filter plate; and
aligning said TFT plate with said color filter plate.

2. The method of claim 1, wherein the rubbing process causes a second abnormal rubbing area on said color filter plate adjacent to said black matrix area, and after said TFT plate and said color filter plate are aligned, said first abnormal rubbing area and said second abnormal rubbing area do not overlap.

3. A method of aligning a thin-film transistor (TFT) plate and a color filter plate, a capacity storage area being on said TFT plate and being designed within a black matrix area of said color filter plate, wherein after a rubbing process is performed on said TFT plate and said color filter plate, a bump in said capacity storage area on said TFT plate causes a first abnormal rubbing area, said first abnormal rubbing area is adjacent to a side of said bump, and the rubbing process causes a second abnormal rubbing area on said color filter plate adjacent to said black matrix area, said method comprising:

shifting said color filter plate, in order that said first abnormal rubbing area is covered with a black matrix in said black matrix area of said color filter plate, and said first abnormal rubbing area and said second abnormal rubbing area do not overlap; and
aligning said TFT plate with said color filter plate.

* * * * *